(12) United States Patent
Glezer et al.

(10) Patent No.: US 8,875,509 B2
(45) Date of Patent: Nov. 4, 2014

(54) POWER GENERATION USING BUOYANCY-INDUCED VORTICES

(75) Inventors: Ari Glezer, Atlanta, GA (US); Mark Simpson, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 269 days.

(21) Appl. No.: 13/390,569

(22) PCT Filed: Aug. 27, 2010

(86) PCT No.: PCT/US2010/046902
§ 371 (c)(1), (2), (4) Date: Feb. 15, 2012

(87) PCT Pub. No.: WO2011/025914
PCT Pub. Date: Mar. 3, 2011

(65) Prior Publication Data
US 2012/0139259 A1 Jun. 7, 2012

Related U.S. Application Data

(60) Provisional application No. 61/238,475, filed on Aug. 31, 2009.

(51) Int. Cl.
*F03G 6/00* (2006.01)
*F03G 6/04* (2006.01)

(52) U.S. Cl.
CPC . *F03G 6/04* (2013.01); *Y02E 10/46* (2013.01); *Y02E 10/725* (2013.01)
USPC .......... 60/641.11; 60/641.12; 290/44; 290/55

(58) Field of Classification Search
CPC ............. F03G 6/045; F03G 6/04; F03G 6/06; F02C 1/00; F02C 1/05; Y02E 10/46; Y02E 10/725
USPC ......... 60/641.8, 641.11, 641.12; 290/1 R, 44, 290/55
See application file for complete search history.

(56) References Cited

U.S. PATENT DOCUMENTS 4,070,131 A * 1/1978 Yen .................................. 415/4.4
4,075,500 A * 2/1978 Oman et al. ..................... 290/55
(Continued)

FOREIGN PATENT DOCUMENTS

WO         00/42320        7/2000

OTHER PUBLICATIONS

PCT International Search Report and Written Opinion in co-pending, related PCt Appliction No. PCT/US2010/046902, mailed Aug. 27, 2010.

(Continued)

*Primary Examiner* — Hoang Nguyen
(74) *Attorney, Agent, or Firm* — Thomas | Horstemeyer, LLP.

(57) ABSTRACT

Various systems and methods are provided for power generation using buoyancy-induced vortices. In one embodiment, among others, a vortex generation system includes a nucleating obstruction; an array of vanes distributed about the nucleating obstruction, the array of vanes configured to impart an angular momentum on air drawn through the array of vanes to form a columnar vortex over the nucleating obstruction; and a set of turbine blades positioned over the nucleating obstruction, the set of turbine blades configured to extract power from the columnar vortex. In another embodiment, a method for power extraction from a buoyancy-induced vortex includes establishing a thermal plume; imparting angular momentum to boundary layer air entrained by the thermal plume to form a stationary columnar vortex; and extracting power from the stationary columnar vortex through turbine blades positioned within the stationary columnar vortex.

25 Claims, 8 Drawing Sheets

(56) References Cited

U.S. PATENT DOCUMENTS

| | | |
|---|---|---|
| 4,222,242 A | 9/1980 | Moseley |
| 4,275,309 A | 6/1981 | Lucier |
| 4,452,046 A | 6/1984 | Valentin |
| 6,510,687 B1 * | 1/2003 | Zaslavsky et al. .............. 60/398 |
| 7,086,823 B2 | 8/2006 | Michaud |
| 7,400,057 B2 * | 7/2008 | Sureshan ........................ 290/55 |
| 7,511,387 B2 * | 3/2009 | Fakhrai ........................... 290/54 |
| 7,931,434 B2 * | 4/2011 | Raynal ........................... 415/2.1 |

OTHER PUBLICATIONS

Office Action Received for related IL Application No. 218312 mailed Jan. 6, 2014.

Office Action received for related CA Application No. 2,806,794 mailed 2014-0-25.

* cited by examiner

POWER GENERATION USING BUOYANCY-INDUCED VORTICES

CROSS-REFERENCE TO RELATED APPLICATION

This application is a 371 application of PCT Application No. PCT/US2010/046902, filed Aug. 27, 2010 and entitled "POWER GENERATION USING BUOYANCY-INDUCED VORTICES", which is herein incorporated by reference in its entirety, and which claims priority to, and the benefit of, U.S. provisional application No. 61/238,475, filed Aug. 31, 2009, which is herein incorporated by reference in its entirety.

BACKGROUND

Solar heating of a surface produces thermal layers in the air over the surface. Such naturally-heated air layers occur in hot-climate regions, where air is heated from below by the sun-warmed ground. In these regions, buoyancy-driven vortices (e.g., "dust devils") occur spontaneously and move about the surface before dissipating. In some cases, vortices can exhibit core diameters of up to 50 meters at the surface and heights of up to one kilometer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
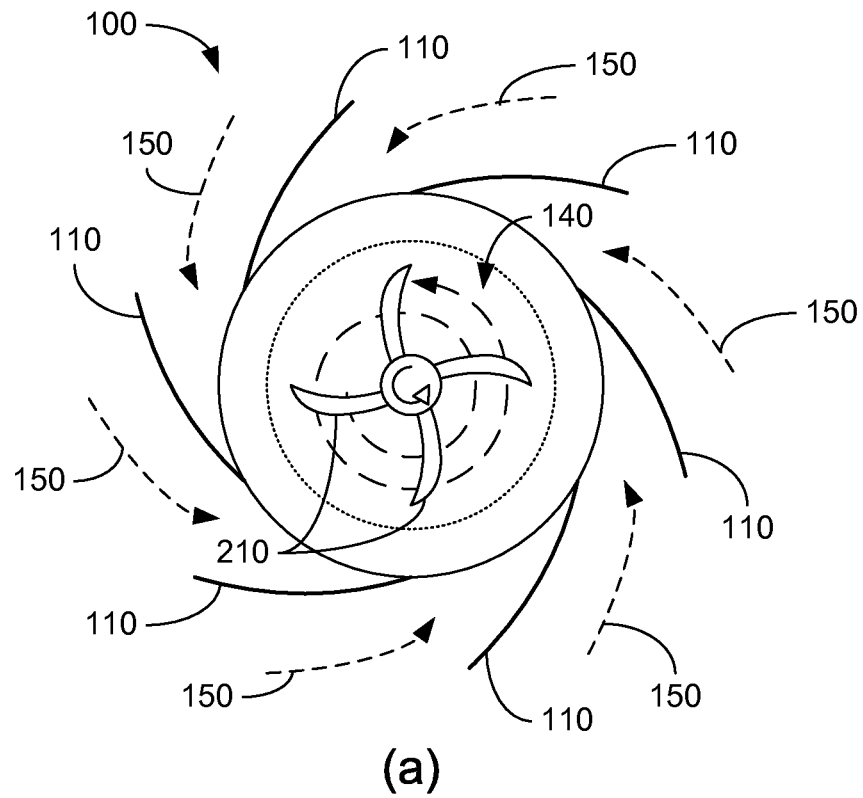
FIG. 1 illustrates a vortex generation system according to various embodiments of the present disclosure.
Figure 1:
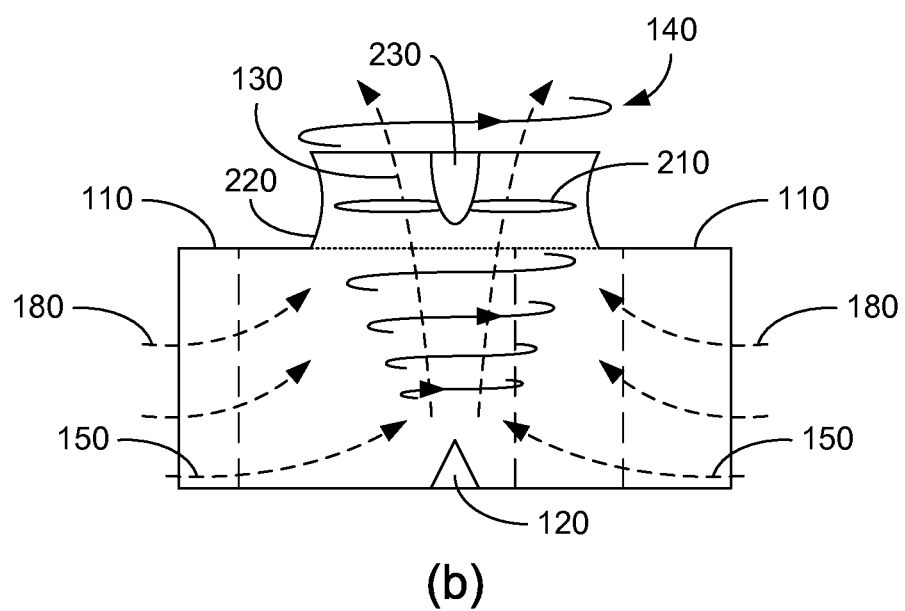

Disclosed herein are various embodiments of power generation using buoyancy-induced vortices. Reference will now be made in detail to the description of the embodiments as illustrated in the drawings, wherein like reference numbers indicate like parts throughout the several views.

Buoyancy in nature is produced by solar heating of the earth's surface which in turn heats the adjacent layer of air reversing the lapse rate and rendering the air layer unstably stratified. This heated air is less dense than the fluid above it and rises as a thermal plume, which can have diameters up to hundreds of meters and exhibit vertical velocities of the order of meters per second. The thermal and velocity profiles of a plume are often characterized as a nominal Gaussian like distribution with little variation at a constant height within the column and a steep drop-off back to ambient conditions at the edge of the plume. A convective plume spreads as it rises from its initial heat source, due to the entrainment of ambient air at the edge of the column. The effect of the entrainment of cooler air into the convective column is to gradually weaken the plume by decreasing the effect of buoyancy and by a spreading of the plume horizontally.

Nominally round rising plumes can evolve into a columnar atmospheric vortex (also known as a "dust devil") by the addition of axial vorticity, for example, by a cross wind along the earth surface. As the heated air rises, the axial vorticity becomes concentrated within a core, and the plume begins to spin about its axis. The sense of rotation depends on the sense of the acquired vorticity. Once the rotation begins, the vortex can continue to intensify by the entrainment of heated air from the surface thermal boundary layer into the plume, which adds to its buoyancy; while the radial force produced by the rotation reduces the entrainment of cooler ambient air along the plume's boundary.

This effect results in the concentration of momentum as the rotation forces a tightening of the buoyant structure, unlike the spreading of a thermal plume. The radial pressure gradient created by the vortex creates an inflow of the heated thermal boundary layer air into the plume, intensifying the buoyancy force. These effects result in a considerable amount of angular momentum being present in the columnar vortex, in addition to the vertical momentum produced by the buoyancy. The velocity profile of a dust devil is similar to that of a Rankine vortex, with the "core" rotating in solid body rotation and the outer flow behaving similar to a potential vortex with an axial velocity similar to a thermal plume.

These buoyancy-driven vortices occur spontaneously, with core diameters of 1-50 meters at the surface, and can achieve heights up to one kilometer. The diameters of naturally occurring dust devils may be estimated by doubling the Obukhov length, which depends on the friction velocity, $$u_* = \left[ \overline{(u'w')}^2 + \overline{(u'v')}^2 \right]^{\frac{1}{4}},$$

and the momentum flux due to buoyancy in the columnar vortex. This scaling of the vortex mean diameter shows good agreement with several field investigations. For an artificially created columnar vortex the scaling is more complex, because the scale of the vortex is imposed by the generating hardware as discussed below.

A comparison of naturally occurring dust devils and thermal plumes was completed by Kaimal, J. C. and Businger, J. A. in "Case studies of a convective plume and a dust devil", Journal of Applied Meteorology, vol. 9, no. 4, pp. 612-620 (August 1970), which is hereby incorporated by reference in its entirety. Field measurements demonstrate that the axial fluxes of kinetic and thermal energy in a columnar vortex are at least an order of magnitude larger than the corresponding fluxes in a non-spinning thermal plume that forms under the same conditions. In addition, the tangential velocity and diameter of the strongest rotation of the columnar vortex remained essentially constant with height (e.g., as shown by measurements taken at heights of up to 22 meters). In general, a thermally induced columnar vortex in nature has higher linear momentum than a plume of corresponding scale, in addition to the angular momentum associated with the rotation. The columnar vortex entrains heated air near the surface while being maintained at higher elevations by reduced entrainment of cooler air.

Figure 2:
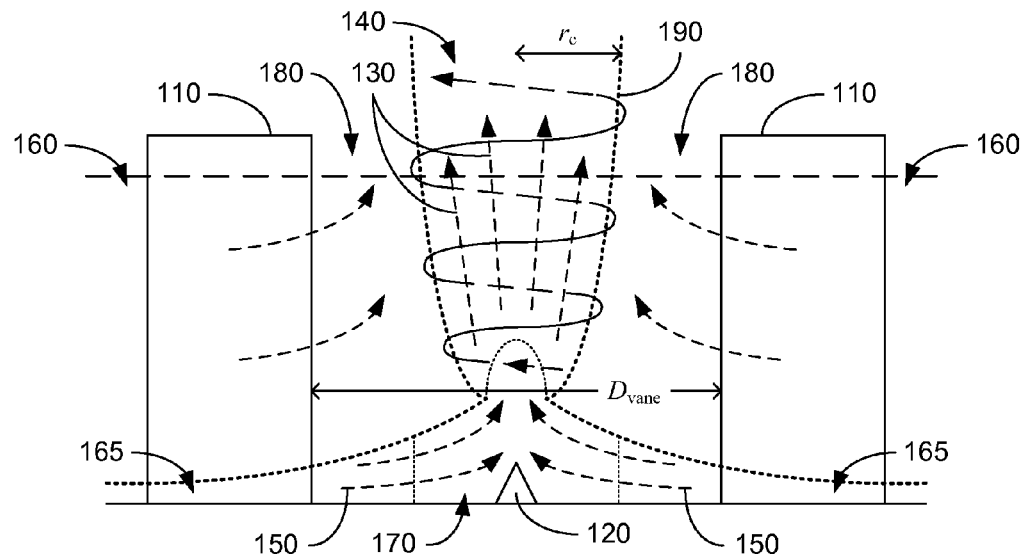
FIG. 2 illustrates a stationary columnar vortex formed within the vortex generation system of FIG. 1 according to various embodiments of the present disclosure.

Buoyancy-induced vortices can be exploited for power generation. With reference to FIG. 1, shown is (a) a top view and (b) a cross-sectional view of an exemplary vortex generation system 100. The vortex generation system 100 includes an array of vanes 110 concentrically distributed about a nucleating obstruction 120. Heating at the nucleating obstruction 120 causes a thermal plume 130 to rise within the vanes 110. The plume 130 can evolve into a stationary columnar vortex 140 by the formation of axial vorticity. Referring to FIG. 2, as the thermal plume 130 rises about the nucleating obstruction 120, air 150 from the heated thermal boundary layer 160 (illustrated schematically by the dashed line) is drawn in through the vanes 110 into the vorticity interaction domain 170 where the surface vorticity is entrained into the buoyant vortex 140 to form its axial core vorticity. Orientation of the vanes 110 imparts angular momentum that supports the formation of axial vorticity with the surface (momentum) boundary layer 165 illustrated schematically by the dashed line in FIG. 2. The imposed angular motion causes the plume 130 to begin spinning about its axis.

The thermal boundary layer 160 is nominally thicker than the momentum boundary layer 165 (the heated air layer above ground is typically much higher than the vanes). It is noted that while the thermal boundary layer 160 is illustrated in FIG. 2 as located below the top of the vanes 110, the thermal boundary layer 160 may extend above the top of the vanes 110. The structure of the forming vortex has two distinct regimes. The inner region, which defines the characteristic radius 190 and scales with the inner diameter of the vanes, is characterized by a concentration of axial vorticity and the outer region 180 that has angular momentum but is virtually irrotational. Once the rotation of the stationary columnar vortex 140 begins, it can continue to intensify by the entrainment of the radial inflow of the heated air layer 150 from the surface momentum boundary layer 165 and the thermal boundary layer 160.

The stationary columnar vortex 140 can be sustained as long as the unstable thermal stratification of the air at the thermal boundary layer 160 is maintained by surface heating and cooling aloft. In nature, solar heating of surfaces provides a renewable source of energy to heat the thermal boundary layer. Nearly one third of global land mass is desert, providing huge untapped regions for vortex energy harvesting. Desert solar energy is an untapped renewable resource, largely free of adverse environmental impacts, competitive in magnitude with fossil sources, and widely distributed across the planet with a high degree of diurnal and seasonal predictability. Other natural heat sources (e.g., geothermal sources) may also be used for thermal boundary layer 160 heating.

Similarly, waste heat in industrial environments can be used as the source of heated air that forms the buoyancy induced columnar vortex. An advantage in such industrial environments is that once the vortex is formed, the waste heat convectively removed by the air is naturally drawn into the vortex by entrainment without the assistance of mechanical blowers. Industrial waste heat such as, but not limited to, that produced in many manufacturing processes, ovens, kilns, furnaces, extruders, etc., may be utilized to create the thermal boundary layer. This is an attractive attribute, because natural or industrial heat sources for buoyancy-driven vortices are typically continuously available. In either heating environment the vortex generation system 100 may be installed in a fixed location or may be portable and capable of movement between installations.

Figure 3:
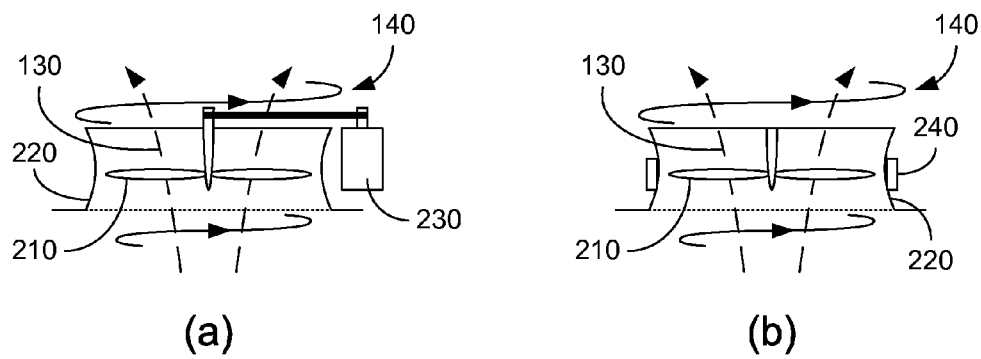
FIGS. 3 and 4 illustrate turbine blade positioning within the vortex generation system of FIG. 1 according to various embodiments of the present disclosure.

Referring back to FIG. 1, placing turbine blades 210 within the stationary columnar vortex 140 allows for extraction of energy from the angular and vertical flow of the vortex 140. In one embodiment, the turbine blades 210 may be located within housing or cowling 220 to assist in harvesting the tangential and axial momentum of the stationary columnar vortex 140 as depicted in FIG. 1(b). In alternative embodiments, the turbine blades 210 may be located above the array of vanes 110 without a housing or cowling 220. In other embodiments, the turbine blades 210 may be located within the array of vanes 110 (see, e.g., FIG. 5(b)). In the exemplary embodiment of FIG. 1, the generator 230 is located within the stationary columnar vortex 140 and directly coupled to the turbine blade 210. In other embodiments, the generator 230 can be located outside the stationary columnar vortex 140. For example, the generator 230 can be located outside the housing or cowling 220, as depicted in FIG. 3(a), or outside the array of vanes 110. The generator 230 may be coupled to the turbine blades 210 as appropriate. Alternative embodiments, such as the exemplary embodiment of FIG. 3(b), may utilize the turbine blades 210 to form a portion of the rotor of a generator. For example, a rotor winding (or cage) may be distributed about the outer tips of the turbine blades 210. Stator windings 240 distributed about the rotor winding (or cage) to form a generator and allow for conversion of the rotational energy into electrical energy.

Figure 4:
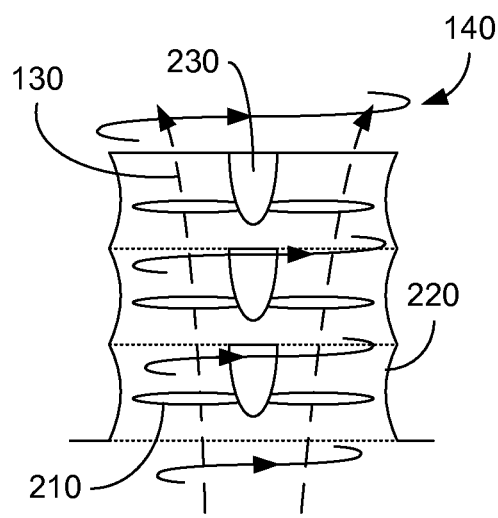

If temperature drop in the air stream across the turbine blades 210 is negligible and the temperature of the stationary columnar vortex 140 remains constant for some height above the surface, the buoyancy force can accelerate the flow axially downstream from the turbine. Given this acceleration and the residual angular momentum within the flow additional turbine blades 210 can be added to capture additional energy in the vortex as illustrated in FIG. 4. Therefore, multiple generators can be beneficial as each stage of turbine blades 210 in buoyancy driven flow would continue to remove some of the energy from the columnar vortex 140. As depicted in FIGS. 1 and 4, one or more levels of turbine blades 210 can be added within housings or cowlings 220 to capture the remaining rotational energy in the vortex. In other embodiments, one or more levels of turbine blades 210 can be provided within the array of vanes 110 (FIG. 5) to capture some of the remaining energy in the vortex. In alternative embodiments, one or more levels of turbine blades 210 can be located within both housings or cowlings 220 and the array of vanes 110.

The power that may be produced by the stationary columnar vortex 140 also depends on the radial distribution of tangential and axial velocities. The location of largest tangential velocity is at the edge of the core flow 190 and decays for larger radial distances. Therefore more torque, or power, can be produced by a stationary columnar vortex 140 with a larger diameter. This is an important consideration for determining the useable power that can be obtained from a single or multiple columnar vortices 140. For a given heat flux into the air, the proposed setup generates a fixed diameter columnar vortex 140. The generated power can increase by optimally increasing the internal vane diameter.

The power that may be captured from a stationary columnar vortex 140 (e.g., by turbine blades at a given elevation) can be estimated by computing the axial and tangential velocity components based upon a model described by Rennó, N. O., Burkett, M. L., and Larkin, M. P. in "A simple thermodynamical theory for dust devils", Journal of the Atmospheric Sciences, vol. 55, no. 21, pp. 3244-3252 (November 1998), which is hereby incorporated by reference in its entirety, and using simple control volume analysis. The natural convective cycle of the atmosphere can be modeled as a heat engine as the sensible heat that is absorbed from the earth surface is converted into mechanical work creating updrafts of warm buoyant air. The cycle is completed when the air radiates the additional thermal energy as it reaches the convective layer of the atmosphere producing downdrafts of cool makeup air.

In a dry atmosphere the vertical temperature gradients (within and outside of a thermal plume 130) are isentropic, and hence it can be assumed that the system can be represented by a simple Carnot heat engine. The distribution of the axial (or vertical) velocity (w) is uniform across the vortex core and decays exponentially outside. The axial velocity component (w) is a function of the sensible heat flux into the air ($F_{in}$), the temperature difference between the convective layer and the surface ($\eta$), the coefficient of viscous dissipation in the atmosphere ($\mu$), and the atmosphere's ability to cool the air in the convective layer by radiation ($8\epsilon\sigma T_c^3$), that is expressed by:

$$w \approx \left[\left(\frac{c_p}{8\epsilon\sigma T_c^3}\right)\frac{\eta F_{in}}{\mu}\right]^{1/2}.$$

The tangential (at the edge of the vortex core) velocity component (v) is a function of the universal gas constant (R), the surface mean temperature ($T_s$), the fraction of mechanical energy lost due to viscous effects at the surface ($\gamma$), the horizontal thermal efficiency ($\eta_H$), and $\chi = c_p/R$, that is expressed by:

$$v = \left\{R\overline{T}_s\left[1 - \exp\left(\frac{\gamma\eta}{\gamma\eta - 1}\right)\left(\frac{1}{\chi}\right)(\eta_H)\right]\right\}^{1/2},$$

where horizontal thermal efficiency ($\eta_H$) is defined as the ratio of sensible heat flux into the air to total heat flux ($\eta$).

These velocity distributions may be used for the estimation of the axial and rotational power. The axial power is based on Betz's law for a typical horizontal axis wind turbine. For a turbine blade 210 of a given geometry (given by the chord z and the span $r_b$) the power that can be extracted per blade 210 from the stationary columnar vortex 140 can be estimated by:

$$P_z = \frac{C_p \rho \Omega^2 z r_1^4}{4}\left[\frac{z}{z - z_b} - 1\right] \text{ for } 0 < r < r_c, \text{ and}$$

$$P_r = C_p \rho \Omega^2 z r_1^4 \ln\left(\frac{r_2}{r_1}\right)\left[\frac{z}{z - z_b} - 1\right] \text{ for } r_c < r < r_b.$$

where $C_p$ is the coefficient of performance, $r_c$ the radius of the core, $\Omega$ the angular velocity at $r_c$, and $z_b$ the chord of the turbine blade. Given nominal tangential and axial wind speeds of 11 m/s (or 39.5 km/hr) and a 5.2 m core diameter for a columnar vortex 140, a four-blade turbine of a constant aspect ratio 10 and a 10.4 meter diameter can, in principle, extract 63 kW (scaled by Betz's maximum coefficient of performance for both the axial and tangential velocity components).

The formation of the columnar vortex can be enhanced or accelerated by forcing stronger buoyancy within the vorticity interaction domain 170 (FIG. 2) near the ground plane using additional heating in some embodiments, the additional heating can be produced by coatings that are applied on and/or around a nucleating obstruction 120 to absorb additional solar radiation, producing a hot spot on the surface of the vorticity interaction domain 170. In other embodiments, industrial waste heat may be transported to the surface of the vorticity interaction domain 170 through heat exchangers to produce a hot spot. Heating elements may also be installed to produce additional heating within the vorticity interaction domain 170. The heat exchangers and/or heaters may be located in the surface around the nucleating obstruction 120, in the nucleating obstruction 120, or combinations thereof. In alternate embodiments, a heat absorbing mass may be located underground at approximately the center of the vorticity interaction domain 170, e.g., below the nucleating obstruction 120. The heat absorbing mass may aid in the collection and retention of solar radiation to produce a hot spot within the vorticity interaction domain 170. The heat absorbing mass may also prolong the presence of the hot spot within the vorticity interaction domain 170 when cloudy or after sunset.

Figure 5:
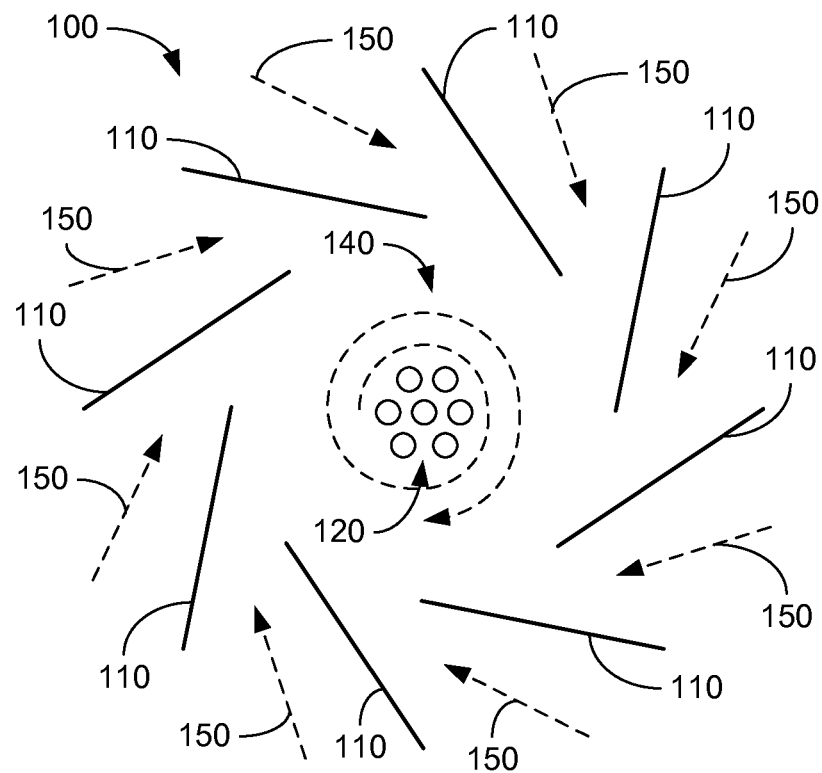
Figure 5:
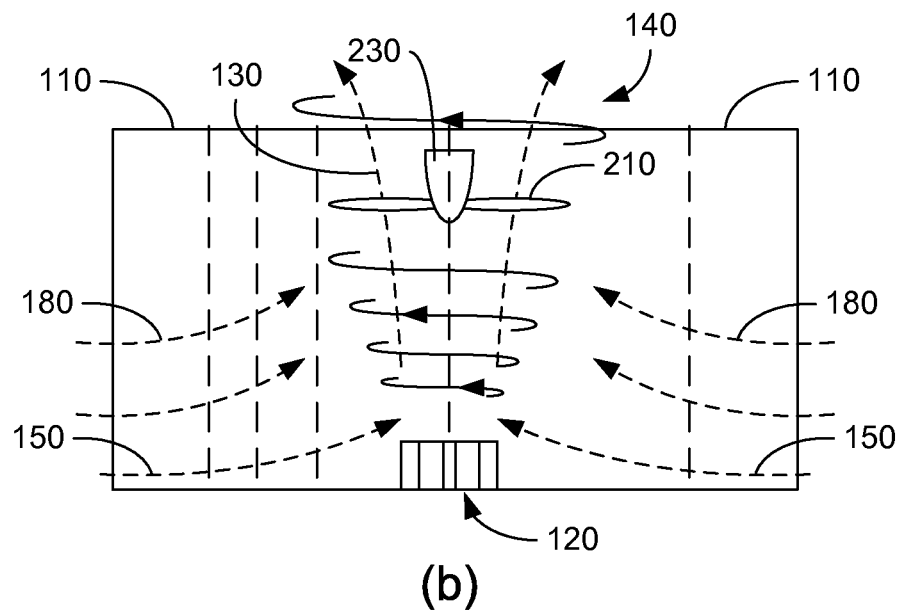

The nucleating obstruction 120, including one or more passive trigger protrusions on the ground plane, can "nucleate" a columnar vortex 140. The nucleating obstruction 120 may be a single passive element such as, but not limited to, a conical protrusion (as illustrated in FIG. 1) or a cylindrical protrusion. Alternative embodiments may use a nucleating obstruction 120 including a plurality of passive elements having solid cylindrical, conical, or airfoil cross-sections in order to produce a range of desired effects. Referring to FIG. 5, the exemplary embodiment includes a ring of six cylindrical elements uniformly distributed along the nominal periphery of the "natural" vortex core with a seventh element at the center. More or less passive elements may also be utilized in other configurations. For example, a ring of three or more cylindrical protrusions concentrically distributed about the center of the vorticity interaction domain 170 to form the nucleating obstruction 120. In addition to anchoring the vortex, the number and spatial distribution of the surface-mounted passive trigger protrusions have two primary effects on the vortex structure and its strength (as measured by its circulation). The first effect is on the distribution and magnitude of vorticity within the vortex core, and the second effect is on the radial spreading of the vortex with elevation. For example, as shown in FIG. 11, the radial spreading of the "natural" vortex is larger than in the presence of the passive (cylindrical) protrusions.

Figure 11:
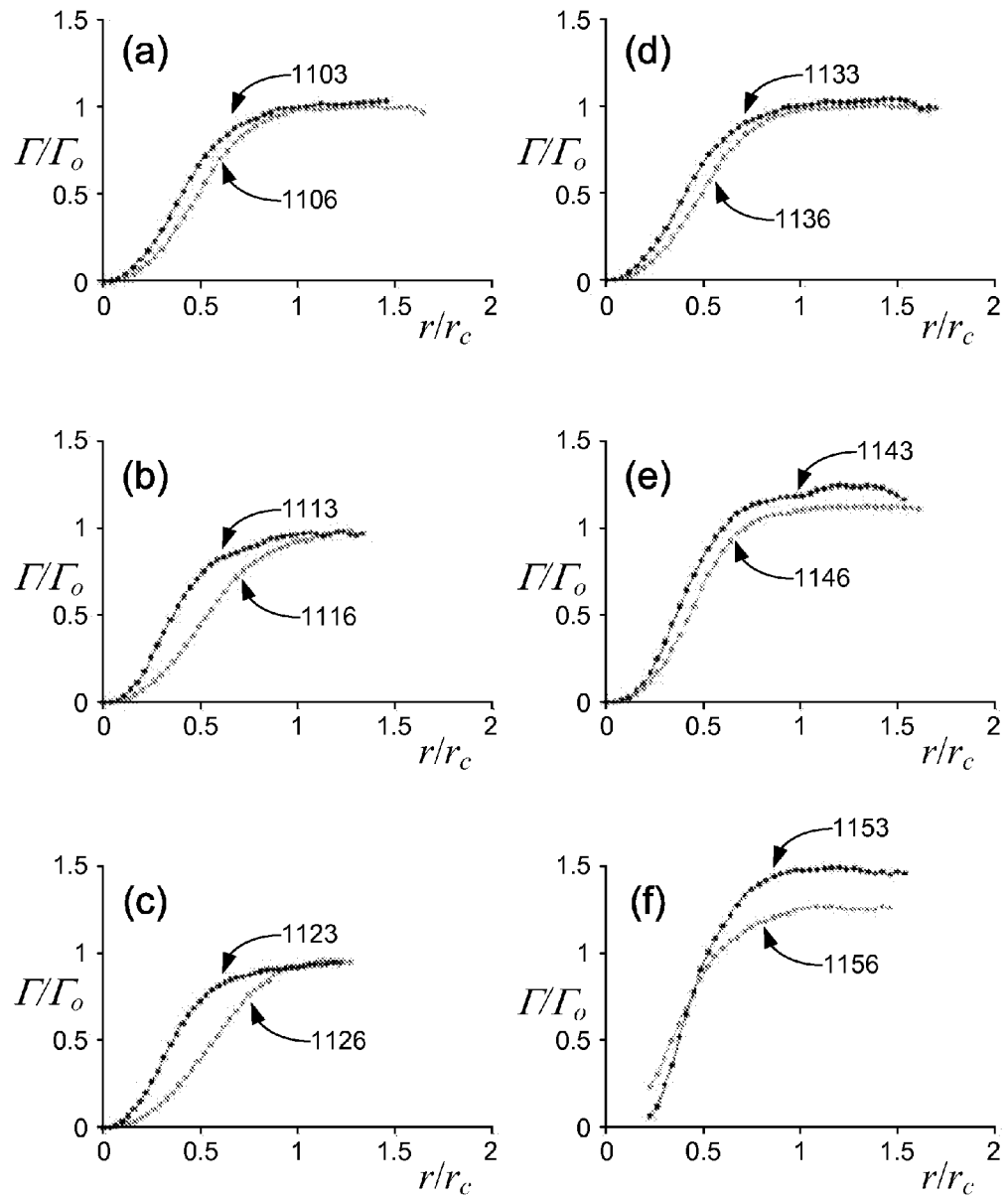

FIG. 11 also illustrates that the total circulation of the vortex may increase by about 5% in the presence of cylindrical protrusions. It should be noted that protrusions having different cross sectional shapes can produce variations in circulation. For example, airfoil cross sections can result in an increase in circulation at a positive angle of attack relative to the oncoming flow. In some embodiments, airfoil cross sections can yield increases of about 10% in circulation relative to the oncoming flow. At the same time the radial spreading of the vortex increases along the vortex axis at an axial rate that is similar to the natural vortex. However, if the angle of attack of the airfoils is negative (relative to the radial flow from the vanes), their effects may become similar to that of the cylinders and the axial spreading of the vortex may be inhibited. In some embodiments, protrusions having a variable cross section (e.g., airfoils or plates) may be controlled to affect vortex properties. The cross section of the protrusions can be adjusted (e.g., manually, using actuators, or using SMA) to achieve the desired affect.

The core circulation of the columnar vortex 140 may also depend on the spatial distribution and number of the surface passive elements. Results indicate that the effects of the protrusions can be additive. For example, an embodiment that helps concentrate the axial vorticity and significantly increase its circulation includes a ring of cylindrical protrusions distributed around the core's edge and a centrally-located protrusion that helps anchor the vortex. This combination yields approximately the sum of the circulations of the center and ring protrusions. The characteristic dimensions of the protrusions are typically selected as a balance between the shed vorticity and the losses (drag).

The characteristic radius of the vortex core is also determined by the radial length scale imposed by the angled vanes. The radial length scale of the columnar vortex 140 may be determined by the (free) cylindrical volume between the vanes 110. For a given internal vane diameter $D_{vane}$ (measured from the tips of the vanes 110 as illustrated in FIG. 2), a vortex diameter $D_c$ ($2 \times r_c$ measured in the absence of a turbine) within which all the vortex core vorticity is contained (and therefore the circulation for $D > D_c$ is invariant) can be defined. The angular momentum of the fluid outside $D_c$ (outer region 180) is nonzero and diminishes asymptotically to zero with increasing radial distance from the vortex centerline. The relationship between internal vane diameter $D_{vane}$ and vortex diameter $D_c$ varies with surface temperature. Based upon experimental measurements (see FIG. 9), $D_c$ decreases with an increase in surface temperature ($T_{surface}$=50-200° C.) for a given $D_{vane}$. This may be approximated as a nearly linear decrease from about $0.55 D_{vane}$ at $T_{surface}$=50° C. to about $0.31 D_{vane}$ at $T_{surface}$=200° C.

Figure 6:
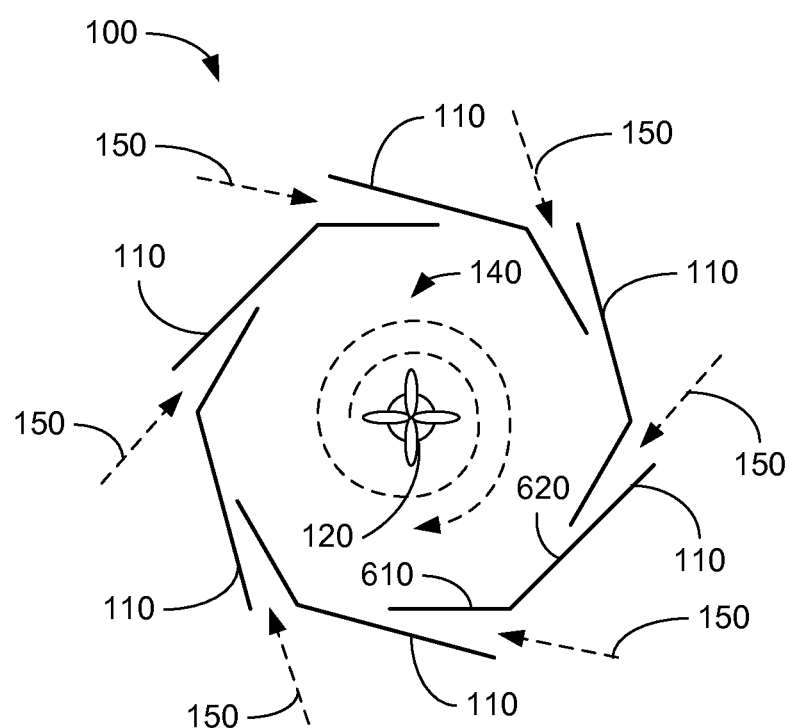
FIGS. 5 and 6 illustrate vortex generation systems according to various embodiments of the present disclosure.

In other embodiments, such as the exemplary embodiment of FIG. 6, a passively rotating mechanism at the center of the vorticity interaction domain 170 may be utilized as the nucleating obstruction 120. The radial entrained flow 150 at the momentum boundary layer 165 spins the device, producing shed vorticity which can be used to enhance the strength and change the shape of the vortex core.

The nucleating obstruction 120 can affect the transport and tilting of the buoyant vortex to form its axial core vorticity. Positioning and distribution of the nucleating obstruction 120 can also alter the core structure of the columnar vortex 140 and/or increase the vortex circulation. Another aspect of the passive protrusions is the nucleation and merging of several adjacent vortices to form a stationary columnar vortex 140 that is stronger than a single "natural" vortex.

The rotation of the formed stationary columnar vortex 140 may be counterclockwise (see, e.g., FIG. 1) or clockwise (see, e.g., FIGS. 5-6) depending on the orientation of the array of vanes 110. Shapes of the vanes 110 can include curved vanes (FIG. 1), straight vanes (FIG. 5), or combinations of shapes such as, but not limited to, angled vanes as depicted in FIG. 6. The array of vanes 110 may also be adjustable or variable, allowing for the adjustment of the positioning angle of the vanes 110. In some embodiments, the vanes 110 may be capable of radial movement to allow for adjustment of the internal vane diameter. By adjusting the positioning of the vanes 110, changes in external conditions may be accommodated for and/or characteristics of the stationary columnar vortex 140 may be adjusted (e.g., the angular momentum of the entrained fluid and/or the core diameter).

A framework supports the array of vanes 110, the turbine blades 210, the cowling 220, and/or the generator 230. In some embodiments, the vanes 110 overlap to inhibit crosscurrents from passing directly through the array of vanes 110 and disrupting or extinguishing the stationary columnar vortex 140. The angular and axial momenta of the flow can be varied from a buoyant plume in the absence of axial vorticity (e.g., when the vanes 110 are directed radically) to a strong buoyant vortex which may induce a significant increases in entrainment. The strength of the stationary columnar vortex 140 can be influenced by a balance between the flow angle of the vanes 110 and the resistance they impose on the entrained flow. In addition, the number, height, width, and shape of the vanes 110 can affect the entrained flow from the thermal boundary layer 160 and the air flow 150 in the momentum boundary layer 165. Shapes of the vanes 110 can include curved vanes (FIG. 1), straight vanes (FIG. 5), or combinations of shapes such as, but not limited to, angled vanes as depicted in FIG. 6. The position of all or a portion of a vane 110 may also be adjustable. For example, with reference to the exemplary embodiment of FIG. 6, each vane 110 may pivot as a whole. In alternative embodiments, the exemplary vanes 110 of FIG. 6 can include an inner portion 610 that is fixed and an outer portion 620 that is moveable at the angled point to allow for adjustment of the outer portion. In the exemplary embodiment of FIG. 6, the outer portion overlaps the inner portion of the adjacent vane 110.

In general the height of the vanes 110 and the radius of the array of vanes 110 may be selected for a desired level of power generation. The power to be generated varies with vortex radius, which scales with the diameter of the array of vanes 110. In some embodiments, a plurality of vortex generation systems 100 may be utilized to generate power within a region. Considerations when utilizing a cluster of vortex-driven turbines may include the available real-estate and restrictions to air passage between the vortex generation systems 100, which may inhibit sufficient volume flow rates to individual turbine drives.

Instrumentation may also be included within the vortex generation system 100 for monitoring and control of the system 100. Optical, thermal, and flow sensing devices (e.g., PIV optics, CCD cameras, thermocouples, and airflow velocity and/or direction sensors) may be distributed within the vortex generation system 100. The instrumentation may be used to monitor characteristics of the stationary columnar vortex 140 such as, but not limited to, axial and tangential air velocities, characteristic radius, and/or air temperature. Signals from the sensing devices can be utilized to control system parameters such as, but not limited to, vane 110 positions and/or turbine blade 210 orientations to improve power capture by the system 100. The turbine blades 210 may be designed for fixed position operation or for variable pitch operation. In some embodiments, the turbine blades 210 include temperature dependent wiring for monitoring. One method, among others, for a "passive" blade adjustment with flow conditions is to alter blade shape, e.g., the blade pitch or twist and/or cross section shape (camber) of the blade. In one embodiment, shape memory alloy (SMA) may be utilized. The SMA can be activated by the ambient temperature without need for powered actuators. Other options can include, but are not limited to, monitoring of the ambient temperature and using some form of powered actuators (e.g., electromagnetic and/or piezoelectric) for "active" control of the blade shape. Adjustments in blade shape can optimize performance (e.g., power output) during different times of the day as temperature or other conditions change. In other embodiments, the turbine blades 210 are constructed of dissimilar metals to passively and/or actively alter blade twist and/or camber. Similar arrangements can be included in the vanes 110 and used for "passive" or "active" performance adjustments.

Figure 7:
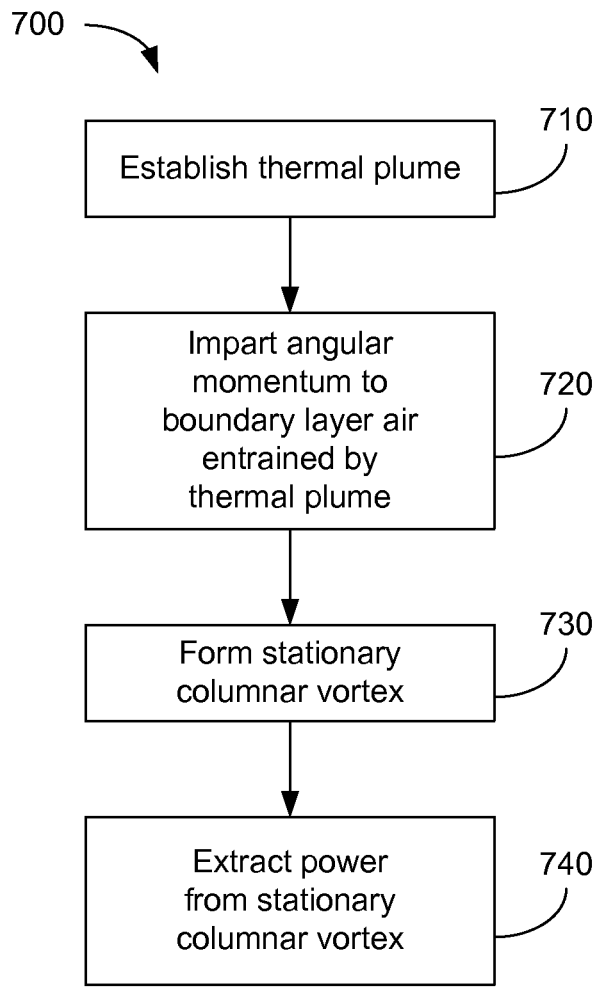
FIG. 7 is a flow diagram illustrating steps for power extraction from a buoyancy-induced vortex according to various embodiments of the disclosure.

Referring to FIG. 7, shown is a flow diagram 700 illustrating steps for power extraction from a buoyancy-induced vortex according to various embodiments of the disclosure. To begin, in block 710, a thermal plume is established. The thermal plume may be established by heating thermal boundary layer air. In some embodiments, the thermal plume is established over a nucleating obstruction. Heating at a surface and/or the nucleating obstruction causes the thermal boundary layer air to rise, thereby entraining warm ambient air. Angular momentum is imparted to the entrained thermal boundary layer air in block 720. Orientation of the vanes 110 imparts angular momentum to the thermal boundary layer air passing through the vanes, causing the thermal plume to begin spinning about its axis and forming stationary columnar vortex 140 (FIG. 2) in block 730. In some embodiments, positioning of the vanes may be varied to adjust the stationary columnar vortex 140. Power may then be extracted from the stationary columnar vortex through turbine blades positioned within the stationary columnar vortex in block 740. In some embodiments, pitch of the turbine blades may be varied to adjust the power extraction.

Experimental Results

Investigations of controlled formation and characterization of a stationary columnar vortex 140 in a meter-scale test was performed utilizing a system similar to that depicted in FIG. 6. Ground heating was simulated by a planar controllable 4.8 kW heater (1 m×1 m) covered with an aluminum plate. During the testing, the surface temperature was varied between about 50° C. to about 200° C. Six thin adjustable radial aluminum vanes 110, distributed azimuthally around the center of the plate, were used to impart tangential momentum to the entrained air 150 to sustain a central stationary buoyancy-driven vortex 140. Each vane 110 extended from the surface of the plate and is approximately sixty centimeters high and fifty centimeters wide. Flow diagnostics included smoke visualization and particle image velocimetry (PIV) by remote seeding of the radially-entrained air to minimize flow disturbances. During testing, the vortex reached a height of about 4 meters with a core diameter varying from about 12 to 24 centimeters.

Figure 8:
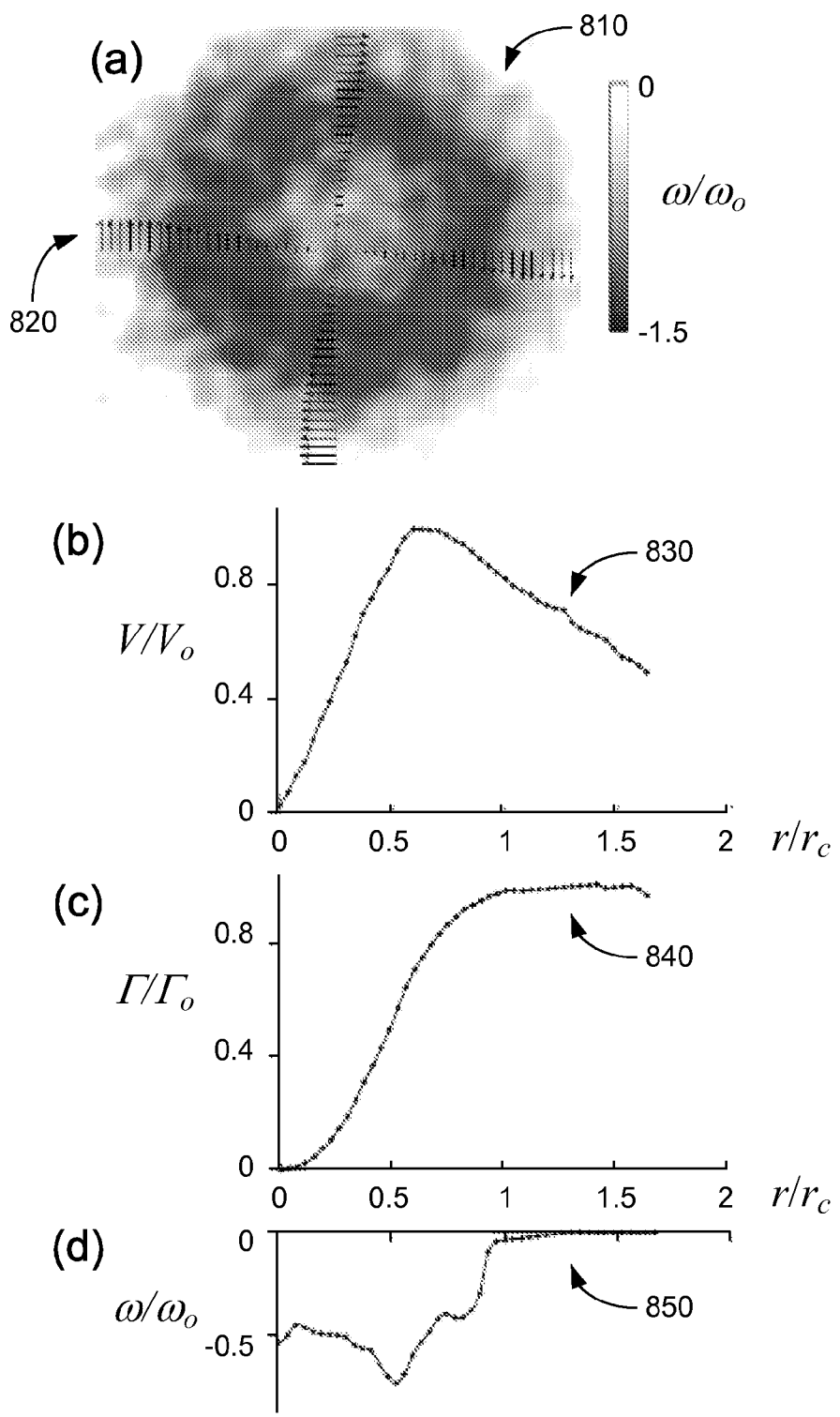
FIG. 8 graphically represents characteristics of a stationary columnar vortex according to various embodiments of the present disclosure.

Referring to FIG. 8, a horizontal cross section through the core of a buoyancy induced columnar vortex 140 is shown in FIG. 8(*a*) using a raster mapping of the distribution of time-averaged axial (vertical) vorticity (ω) 810 within the core along with radial distributions of the tangential velocity (V) 820 with a surface temperature of 100° C. The horizontal cross section of FIG. 8(*a*) corresponds to the x-y plane at a height of z=10 cm (above the surface). FIGS. 8(*b*)-8(*d*) show the corresponding normalized radial distributions of the time-averaged tangential velocity V(r) 830, circulation Γ(r) 840, and vorticity ω(r) 850, respectively. For scaling purposes, the characteristic radius of the vortex ($r_c$) is taken to be the location where the circulation becomes radially-invariant (see e.g., FIG. 8(*c*)). The distributions are normalized by the circulation $\Gamma_o$, peak velocity $V_o$, and the characteristic vorticity $\omega_o = \Gamma_o/R_c^2$ (respectively) at z=10 cm and $T_{surface}$=100° C. The vorticity map 810, and the corresponding line plot 850, shows that the axial vorticity ω(r) is nearly uniformly-distributed within the core for $r/r_c$<0.4, while the tangential velocity V(r) 830 increases linearly with r indicating solid body rotation. The axial vorticity ω(r) 850 is above the core level and has a local maximum for the annular domain within 0.6<r/$r_c$<1.0, before it decays and vanishes outside the core. The circulation Γ(r) 840 becomes invariant beyond the radial peak of tangential velocity V(r) 830 for r>$r_c$.

Figure 9:
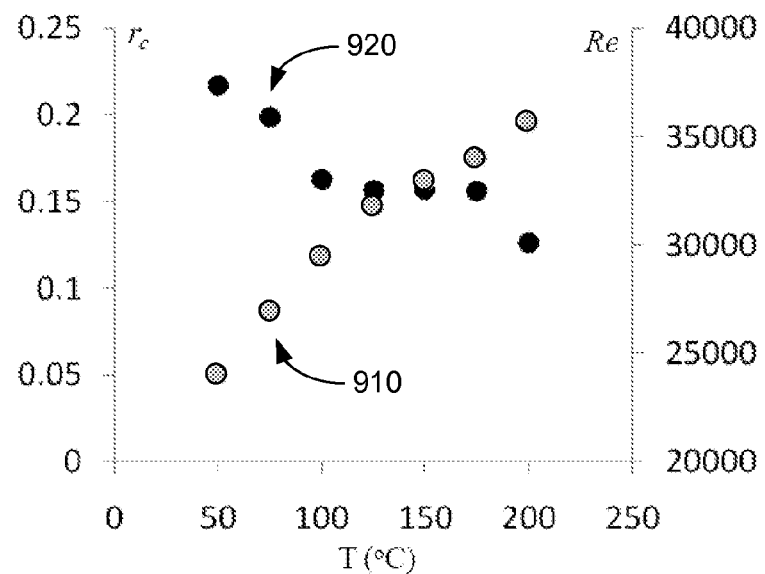
FIG. 9 illustrates variations in columnar vortex characteristics with changes in surface temperature according to various embodiments of the present disclosure.

Referring now to FIG. 9, variations in the characteristics 910 and 920 (i.e., Reynolds number Re=Πv, and characteristic radius $r_c$, respectively) of the stationary columnar vortex 140 with changes in surface temperature ($T_{surface}$=50-200° C.) are shown (at z=0.6$r_c$). The data plots 910 and 920 illustrate that while the vortex strength (and Re 910) increases with the buoyancy force produced by the surface temperature, its characteristic radius 920 actually decreases, indicating that the magnitude of the vorticity within the core increases significantly and with it the angular momentum of the core fluid. The increase in characteristic circulation with $T_{surface}$ may be limited during testing by the ability of the surface to convectively heat the entrained air 150 (FIG. 2) owing to its limited planar dimensions.

Evolution of the buoyancy-driven columnar vortex 140 is affected by the flow within the vorticity interaction domain 170 (FIG. 2) which can modify the transport and tilting of the surface momentum boundary layer vorticity into the buoyant vortex 140 to form its axial core vorticity. A nucleating obstruction 120 can affect the formation and structure of the stationary columnar vortex 140. For example, distributions of passive trigger objects on the ground plane of the vorticity interaction domain 170 can "nucleate" a columnar vortex 140 and alter its core structure and/or increase its circulation. The passive protrusions can also cause the nucleation and merging of several adjacent vortices to form a stationary columnar vortex 140 that is significantly stronger than a single "natural" vortex.

Testing was performed comparing the characteristics of a "natural" vortex formed without a nucleating obstruction 120 and a stationary columnar vortex 140 formed with a nucleating obstruction 120 similar to that illustrated in FIG. 5. The nucleating obstruction 120 included a ring of six cylindrical elements uniformly distributed along the nominal periphery of the "natural" vortex core along with a seventh element at the center. Other combinations of passive elements (e.g., number of elements, placement, and shape of the elements, e.g., cylindrical, conical, or airfoil cross sections) may be utilized in order to produce a range of desired effects. During testing, the protrusions were solid cylinders placed upright on the solid surface, each having a height and diameter of 0.15$r_c$ and 0.1$r_c$, respectively, with $r_c$=16 cm. The increase in core circulation of the columnar vortex 140 can depend on the spatial distribution and number of the surface passive elements.

Figure 10:
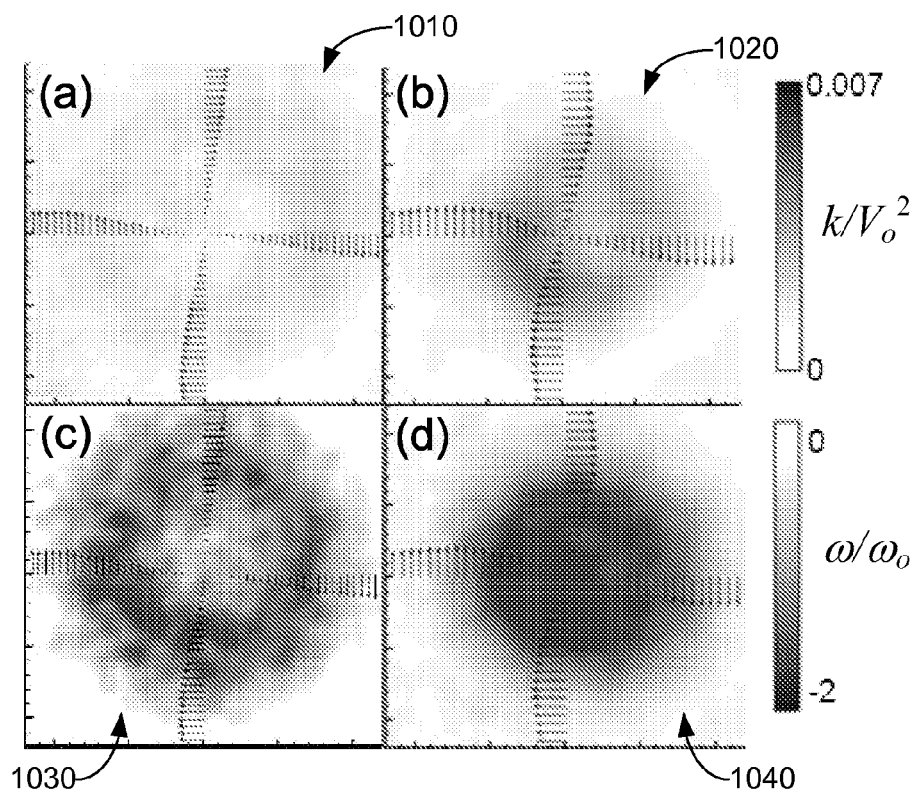
FIGS. 10 and 11 illustrate differences in characteristics of a stationary columnar vortex and a "natural" vortex according to various embodiments of the present disclosure.

Referring next to FIG. 10, shown are raster mappings illustrating the distribution of the kinetic energy (TKE of FIGS. 10(*a*)-10(*b*)) and the axial vorticity (ω of FIGS. 10(*c*)-10(*d*)) within a horizontal cross section through the core of the "natural" vortex (FIGS. 10(*a*) & 10(*c*)) and a horizontal cross section through the core of the buoyancy induced columnar vortex 140 (FIGS. 10(*b*) & 10(*d*)) formed with the 7-element nucleating obstruction 120 described above. The data of FIG. 10 was measured at z=10 cm and $T_{surface}$=100° C. Comparison of the "natural" vortex mappings 1010 and 1030 and the stationary columnar vortex mappings 1020 and 1040, respectively, shows that the presence of the passive elements of the nucleating obstruction 120 results in a significantly smaller core when the nucleating obstruction 120 is included. The measurements indicate that the characteristic radius of the columnar vortex 140 formed with the seven passive elements is 89% of the characteristic radius of the "natural" vortex ($r_{c\text{-"nucleated"}}$=0.89$r_{c\text{-"natural"}}$) under these conditions. Additionally, the presence of the 7-element nucleating obstruction 120 leads to an increase in circulation where $\Gamma_{\text{"nucleated"}}$=1.05$\Gamma_{\text{"natural"}}$. These measurements show that the interaction of the passive elements with the entrained air 150 (FIG. 2) near the center of the vortex core affects the structure of the columnar vortex 140. Placement of the passive elements farther away from the core center diminishes their effect. Dimensions and orientation of the passive elements can also affect the structure of the columnar vortex 140. Combinations of elements of different shapes and/or dimensions may also affect the structure of the columnar vortex 140.

The radial variation of the circulation (Γ) of the stationary columnar vortex 140 by the 7-element passive protrusions is shown in FIG. 11. Circulation variations are illustrated in FIGS. 11(a)-11(c) for elevations of $z/r_c$=0.6, 1.2, and 1.8, respectively, and in FIGS. 11(d)-11(f) for surface temperatures of $T_{surface}$=100° C., 150° C., and 200° C., respectively. With reference to FIGS. 11(a)-11(c), although there is no net increase in circulation (Γ) when $T_{surface}$=100° C., comparing the plots 1103, 1113, and 1123 of the stationary columnar vortex 140 with the plots 1106, 1116, and 1126 (respectively) of the "natural" vortex, it can be seen that the core radius of the stationary columnar vortex 140 is less than the core radius of the "natural" vortex at all three elevations (0.89$r_c$ at $z/r_c$=0.6, 0.78$r_c$ at $z/r_c$=1.2, and 0.62$r_c$ at $z/r_c$=1.8). The increase in the circulation of the stationary columnar vortex 140 with surface temperature is evident in FIGS. 11(d)-11(f). Comparing the plots 1133, 1143, and 1153 of the stationary columnar vortex 140 with the plots 1136, 1146, and 1156 (respectively) of the "natural" vortex, it can be seen that the presence of the 7-element nucleating obstruction 120 leads to a remarkable additional increase in circulation (1.05$Γ_{"natural"}$ at $T_{surface}$=100° C., 1.24$Γ_{"surface"}$ at $T_{surface}$=150° C., and 1.49$Γ_{"natural"}$ at $T_{surface}$=200° C.). These results indicate that the passive manipulation of the nucleating obstruction 120 becomes more effective when the buoyancy force of the columnar vortex 140 is stronger.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A vortex generation system, comprising:
   a nucleating obstruction that nucleates a columnar vortex from preheated air in a surface momentum boundary layer;
   an array of vanes distributed about the nucleating obstruction, the array of vanes configured to impart an angular momentum on the preheated air in the surface momentum boundary layer as the preheated air is drawn through the array of vanes to form the columnar vortex over the nucleating obstruction, where the preheated air has been heated in the surface momentum boundary layer over an uncovered surface outside the array of vanes by surface heating, the uncovered surface extending outward from the array of vanes; and
   a set of turbine blades positioned over the nucleating obstruction, the set of turbine blades configured to extract power from the columnar vortex.

2. The vortex generation system of claim 1, further comprising:
   a generator coupled to the set of turbine blades, the generator configured to generate electrical power from the power extracted by the set of turbine blades.

3. The vortex generation system of claim 2, wherein the generator is located within the columnar vortex.

4. The vortex generation system of claim 1, wherein the set of turbine blades is surrounded by a cowling.

5. The vortex generation system of claim 1, wherein the set of turbine blades is positioned below a top of the array of vanes.

6. The vortex generation system of claim 1, further comprising a second set of turbine blades positioned over the first set of turbine blades and the nucleating obstruction.

7. The vortex generation system of claim 1, wherein the nucleating obstruction is a conical element.

8. The vortex generation system of claim 1, wherein the nucleating obstruction comprises a plurality of passive elements protruding from a surface below the array of vanes.

9. The vortex generation system of claim 8, wherein the plurality of passive elements includes a plurality of cylindrical elements protruding from the surface.

10. The vortex generation system of claim 8, wherein each of the plurality of passive elements have the same dimensions.

11. The vortex generation system of claim 8, wherein each of the plurality of passive elements have a variable cross section.

12. The vortex generation system of claim 1, wherein the array of vanes are concentrically distributed about the nucleating obstruction.

13. The vortex generation system of claim 1, wherein positioning of at least a portion of a vane in the array of vanes is adjustable.

14. The vortex generation system of claim 1, further comprising instrumentation for monitoring characteristics of the columnar vortex.

15. The vortex generation system of claim 14, wherein the position of the vanes is adjusted based upon the monitored characteristics.

16. The vortex generation system of claim 14, wherein pitch of the turbine blades is adjusted based upon the monitored characteristics.

17. A power generation system comprising:
   a plurality of vortex generation systems, each vortex generation system comprising:
      a nucleating obstruction that nucleates a columnar vortex from preheated air in a surface momentum boundary layer;
      an array of vanes distributed about the nucleating obstruction, the array of vanes configured to impart an angular momentum on the preheated air in the surface momentum boundary layer as the preheated air is drawn through the array of vanes to form the columnar vortex over the nucleating obstruction, where the preheated air has been heated in the surface momentum boundary layer over an uncovered surface outside the array of vanes by surface heating, the uncovered surface extending outward from the array of vanes; and
      a set of turbine blades positioned over the nucleating obstruction, the set of turbine blades configured to extract power from the columnar vortex.

18. A method for power extraction from a buoyancy-induced vortex, comprising:
   establishing a thermal plume;
   imparting angular momentum to preheated boundary layer air entrained by the thermal plume to form a stationary columnar vortex, the angular momentum imparted to the preheated boundary layer air by an array of vanes distributed on a surface about the thermal plume, where the preheated boundary layer air is heated by surface heating in a surface boundary layer along an uncovered surface surrounding and outside the array of vanes; and
   extracting power from the stationary columnar vortex through turbine blades positioned within the stationary columnar vortex.

19. The method of claim 18, wherein the thermal plume is established by heating boundary layer air outside the array of vanes by surface heating.

20. The method of claim 19, wherein the surface heating is produced by the uncovered surface outside the array of vanes absorbing solar radiation.

21. The method of claim 19, wherein the surface heating of the preheated boundary layer air outside the array of vanes is produced by industrial waste heat.

22. The method of claim 18, wherein the thermal plume is established over a nucleating obstruction.

23. The method of claim 18, wherein positioning of vanes in the array of vanes is varied to adjust a core diameter of the stationary columnar vortex.

24. The method of claim 18, wherein pitch of the turbine blades is varied to adjust the power extraction.

25. The method of claim 18, wherein a plurality of adjacent vortices within the array of vanes merge to form the stationary columnar vortex.

\* \* \* \* \*